United States Patent [19]

Leusner et al.

[11] 4,431,800

[45] Feb. 14, 1984

[54] PROCESS FOR HYDROXYPROPYLATING STARCH

[75] Inventors: Steven J. Leusner, Lakewood, N.J.; Jay H. Katcher, Dover, Del.; Theodore H. Joseph, Cranbury, N.J.

[73] Assignee: General Foods Corporation, White Plains, N.Y.

[21] Appl. No.: 363,728

[22] Filed: Mar. 30, 1982

[51] Int. Cl.³ .............................................. C08B 31/08
[52] U.S. Cl. ................................... 536/111; 426/578; 426/579
[58] Field of Search .................. 536/111, 106, 95, 96; 426/578, 579

[56] References Cited

U.S. PATENT DOCUMENTS

| | | | |
|---|---|---|---|
| 2,516,634 | 7/1950 | Kesler et al. | 536/111 |
| 2,733,238 | 1/1956 | Kerr et al. | 536/111 |
| 2,744,894 | 5/1956 | Benedict et al. | 536/95 |
| 3,278,520 | 10/1966 | Klug | 536/95 |
| 3,299,151 | 1/1967 | Wismer et al. | 52/481 |
| 3,464,857 | 9/1969 | Marotta et al. | 127/33 |
| 3,751,410 | 8/1973 | Caracci et al. | 536/111 |
| 4,112,222 | 9/1978 | Jarowenko | 536/111 |
| 4,167,622 | 9/1979 | Holzer | 536/111 |
| 4,280,851 | 7/1981 | Pitchon et al. | 127/33 |
| 4,281,111 | 7/1981 | Hunt et al. | 536/111 |

*Primary Examiner*—Ronald W. Griffin
*Attorney, Agent, or Firm*—Walter Scott; Thomas R. Savoie; Daniel J. Donovan

[57] ABSTRACT

A process for making propylene chlorohydrin free, hydroxypropylated starch wherein the excess propylene oxide is removed from the reaction mixture before neutralization of the starch. This removal of the propylene oxide prevents the formation of propylene chlorohydrin and thus aleviates the need for its removal.

15 Claims, No Drawings

PROCESS FOR HYDROXYPROPYLATING STARCH

BACKGROUND OF INVENTION

The present invention relates to a process for chemically modifying food materials, and the products formed thereby. More particularly, this invention relates to a process for hydroxypropylating starch and said hydroxypropylated starch. Specifically, this invention produces a hydroxypropylated starch with no detectable residue of prpopylene chlorohydrin.

Etherification of starch improves many of the starch's characteristics. U.S. Pat. No. 2,516,634 issued to Kesler et al. describes the use of a starch etherification process to produce a coldwater swelling starch. Additionally, hydroxypropylation of starch improves the physical characteristics related to the starch's performance as a thickener in products such as puddings. Further advantages of hydroxypropylation include: lowering the gelatinization temperature; increasing the water binding capacity; increasing the starch's lipophilic compatibility, and decreasing the starches tendency toward retrogradation.

Traditionally, the production of hydroxypropylated starch ignores the formation of side products. The addition of starch to an aqueous, alkali, hydroxypropylation-catalyst-containing solution is the first step in the traditional procedure. Once the slurry is homogeneous, propylene oxide is added. After sufficient hydroxypropylation of the starch, the starch may be neutralized and dried, or the starch may be crosslinked, and thereafter neutralized and dried.

Nevertheless, the starch art needs a new hydroxypropylation method. The classical procedure produces propylene chlorohydrin as a side product which remains in the hydroxypropylated starch. However, Governmental regulatory bodies are considering stricter regulation of the chlorohydrin level permissable in foodstuffs. While the chlorohydrin presence can be reduced to an acceptable level by extensive washing, this washing produces significant starch losses.

SUMMARY OF THE INVENTION

The current interest regarding chlorohydrin residues in modified starch has created a need for an alternative hydroxypropylation process. Heretofore, the prior art hydroxypropylation procedures produced chlorohydrin side products that were not completely removed. The prior art also know that washing the hydroxypropylated starch would reduce the chlorohydrin levels. However, washing the hydroxypropylated starch adds to the cost of the process as well as produce a significant starch loss. Nevertheless, hydroxypropylated starch, because of its improved physical characteristics, performs critical functions in food products and is a highly desirable food ingredient. Thus, it is an objective of this invention to produce a hydroxypropylated starch by a process that restricts the formation of chlorohydrin by-products to less than 1 ppm, preferably, to less than 0.1 ppm, and most preferably to below the level of detectability—utilizing present test methods—without washing.

The chlorohydrin residues presently found in hydroxypropylated starch are formed from the excess propylene oxide present after hydroxypropylation. Specifically, the excess propylene oxide reacts with chloride ions from any source during the hydroxypropylation reaction and especially once the slurry is neutralized. Sources of the chloride ions in the hydroxypropylation process includes some of the prior art hydroxypropylation catalysts, the prior art neutralizing acids, and the water in most communities. This invention removes the excess propylene oxide once the desired degree of hydroxypropylation is achieved by utilizing the high relative volatility of propylene oxide. Restated, after hydroxypropylating the starch, the reaction vessel is opened and actively aerated. The vessel is aerated until propylene oxide is not detectable in the airspace above the reaction slurry.

DETAILED DESCRIPTION OF THE INVENTION

Unless otherwise indicated, all parts and percentages herein are by weight and starch is assumed to have an 11% moisture. Furthermore, the term slurry as used herein includes solutions.

Hydroxypropylation is carried out in a reaction vessel, preferably one made of stainless steel. Furthermore, it is desirable that the reaction vessel be closeable, and preferably sealable so as to isolate the atmosphere inside the reaction vessel from that outside so that propylene oxide does not volatilize before reacting with the starch. It is more preferred that the reaction vessel is able to contain superatmospheric pressures, at least up to 5 atmospheres.

An aqueous solution containing a hydroxypropylation catalyst and a processing aid is either added to the reaction vessel or mixed up therein. The hydroxypropylation catalyst may be any salt, but the salt of either an alkai or an alkaline earth metal, especially a hydroxide, carbonate, bicarbonate, or phosphate thereof, or an organic alkali or combinations of these salts are preferred. It is more preferred that this alkali salt be chosen from the group comprising disodium phosphate, trisodium phosphate, sodium hydroxide, potassium hydroxide, calcium hydroxide and combinations of these salts. It is even further preferred that either disodium or trisodium phosphate, sodium hydroxide, or combinations thereof be used as the alkali salt and it is most preferred that sodium hydroxide be used. The amount of the alkali salt used will be sufficient to make the resulting solution, once all the constituents have been added, alkaline. It is preferred that the pH of the hydroxypropylating media be greater than 8.5, and it is most preferred that the hydroxypropylating media be between 10 and 12.5. This pH, in general, is obtained by using between 0.002 and 0.030 parts by weight of sodium hydroxide or the equivalent of another alkali for every part of starch used. It is preferred that between 0.004 and 0.020 parts of the alkali agent is used for each part of starch to be added, and most preferred that between 0.005 and 0.010 parts of the alkali salt is used per weight unit of starch.

The processing aid should be a salt and preferedly chosen from the group of sodium sulfate, magnesium sulfate, disodium orthophosphate, and trisodium orthophosphate. It is more preferred that this processing aid be sodium sulfate. Furthermore, it is desired that between 0.001 and 0.150 parts by weight of the aid are used per part of starch. It is more preferred that less than 0.050 parts of processing aid are used for each part of starch, and it is most preferred that between 0.005 and 0.030 parts of processing aid are used for each part of starch.

Starch, either raw or modified, is added to the hydroxypropylation catalyst and processing aid containing solution. Between 0.1 and 1.0 parts of starch are added for each part of water in the solution. It is preferred that at least 0.4 parts of starch are added for each part of water, and it is more preferred that between 0.7 and 0.86 parts of starch are added for each part water in the slurry. The starch which is added may be derived from any plant source; however, it is preferred that the starch be chosen from the group comprising: corn, wheat, amylo maize, waxy maize, potato, rice, sago, sorghum and tapioca. It is also envisioned that this process could be used to hydroxypropylate gums, cellulose, glycerides, or other molecules with a plurality of hydroxyl groups. Beginning with the addition of the starch, and continuing therefrom, the contents of the reaction vessel are continuously stirred, so as to maintain a homogeneous starch slurry.

To the homogeneous starch slurry, propylene oxide is added. Between 0.005 and 0.25 parts of propylene oxide are added for each part of starch, and preferably between 0.03 and 0.15 parts of propylene oxide per part starch, and most preferred between 0.05 and 0.100 parts of propylene oxide per part of starch are added. The reaction vessel is then closed, so as to prevent any exchange of the atmosphere above the starch with that of the surrounding environment. The starch slurry is kept in the closed, stirred or agitated reaction vessel for about 3 to about 36 hours, preferably between 10 and 30 hours and more preferably between 15 and 20 hours. The temperature of the reaction vessel is kept at about ambient or above, preferably the temperature is kept between 20° C. and 100° C., however, for starch, between 30° C. and 45° C. is more preferred, and between 38° C. and 42° C. is most preferred. Furthermore, it is preferred that the pressure within the vessel be at about 1 atmosphere or more, and more preferably the pressure in the reaction vessel is between 1 and 5 atmospheres.

The next step is dependent upon whether or not this hydroxypropylated starch is to be crosslinked. If the starch is to be crosslinked, any classical starch crosslinking procedure can then be inserted at this point in the process; however, the removal of propylene oxide could be either before or after crosslinking. In those cases where the starch is not to be crosslinked, the propylene oxide is removed after the hydroxypropylation step. Removal of the propylene oxide is monitored by any reliable analytical method. It is preferred that this analytical method be able to detect at least 0.1 parts per million (ppm) of propylene oxide in the starch slurry headspace. The more preferred analytical method is to analyze the head space above the slurry by gas chromatography. The most preferred analysis is by gas chromatography using a polar liquid phase and a temperature program below 100° C., and a 70° C. isothermal analysis being the most preferred temperature program for this analysis.

The propylene oxide is removed by opening the reaction vessel and allowing the headspace atmosphere therein to exchange with the surrounding environment. It is preferred that some means of actively removing the propylene oxide from the starch slurry used, in particular, a means such as mixing the slurry so as to incorporate an excess of air into the slurry so that the air will strip said slurry of its propylene oxide; or any other means of actively aerating or deaerating the slurry, including the use of reduced pressures, may be employed. It is more preferred that the slurry be actively aerated by the use of a compressed gas source, preferably a clean compressed gas source, which includes a means of filtering particulate matter and grease or pump oils from the gas, as well as a means of dispersing the gas, preferably into finely divided bubbles, into the slurry. The most preferred means of aerating the slurry would be to bubble clean gas through a gas diffusing stone or sparger inserted in the slurry while this slurry is being stirred and the reaction vessel is open. The slurry is aerated until less than 0.1 ppm of propylene oxide is detected in either the starch slurry or its headspace. Typically, aeration will require between 0.25 and 24 hours.

It is preferred that the gas used to actively aerate the slurry be chosen from the group air, nitrogen, and helium. Additionally, it is preferred that the gas flow through the slurry at a flow rate of at least 850 cubic centimeters at STP per minute per kilogram of the starch slurry.

The starch slurry, after the propylene oxide is removed, is neutralized prior to drying. The slurry may be neutralized with any non-chlorine containing mineral or organic food grade acid, and it is preferred that this acid be either sulfuric, phosphoric, or acetic acid. Sufficient acid should be added so as to make the pH of the final solution before drying non-alkaline. It is preferred that this final pH be between 5.0 and 7.0. The starch slurry is then dried, preferably by drum or spray drying, and more preferably by a drying process which pregelatinizes the starch such as the cook-spray drying of U.S. Pat. No. 4,280,851 issued to Pitchon et al. Two separate samples were prepared by the following procedure.

EXAMPLE I AND II

In a sealable, stainless steel, reaction vessel, 112 grams of sodium hydroxide and 240.0 grams of sodium sulfate are added to 20 kilograms of water. When these salts are completely dissolved, 16 kilograms of tapioca starch was also added so as to produce a 44% starch solids slurry. Once stirring has produced a homogeneous slurry, 1280 grams of propylene oxide—8% by weight of the starch—was added and the reaction vessel sealed. This stirring was continued until the slurry was removed for spray-drying. The reaction vessel had a steam/water jacket which was used to maintain the temperature inside the reaction vessel at 43° C. for 17 hours. Following hydroxypropylation, the lid on the reaction vessel was opened and the surry was actively aerated by bubbling clean compressed air through a gas diffusing stone inserted into the slurry in the reaction vessel. This aeration was continued for 8 hours after which there was no detected propylene oxide by means of a gas chromatographic head space analysis of the slurry. The chromotography was isothermal at 70° C. on a polar column. After aeration, the slurry was then neutralized by the addition of sufficient phosphoric acid to produce a pH of 6.0. This starch slurry was then spray dried.

EXAMPLES III AND IV

Examples III and IV were produced by the same procedure as Examples I and II, except that following hydroxypropylation, the starch slurry was not aerated.

Table 1 illustrates the effectiveness of aerating the hydroxypropylated starch slurry in preventing chlorohydrin formation. The chlorohydrin level in the hydroxypropylated starches of Examples I and II is acceptable, based on the present U.S. FDA standard of 5 ppm. (21 C.F.R. 172.892).

TABLE 1

| Sample | Propylene Chlorohydrin Content (ppm) |
|---|---|
| Example I | 0.1 |
| Example II | <0.1 |
| Example III | 25.6 |
| Example IV | 88.0 |

This acceptability is in stark contrast to the chlorohydrin levels which are found in the starch hydroxypropylated according to Examples III and IV.

What is claimed:

1. A process for making a neutral, hydroxypropylated starch with less than 1 ppm of propylene chlorohydrin comprising:
   (a) making an aqueous alkali solution in a reaction vessel wherein said alkali solution is effective to maintain a pH in excess of 8.5 after the addition of a hydroxypropylation aid, a catalyst, and starch;
   (b) dissolving the hydroxypropylation processing aid and the catalyst in said alkali solution;
   (c) adding between 0.1 and 1.0 parts of starch to each part of water in the catalyst and processing aid containing solution with continuous stirring so as to form a homogenous starch slurry.
   (d) adding propylene oxide to the homogenous starch slurry;
   (e) closing the reaction vessel and keeping it at an eleveated temperature for an extended period of time so as to hydroxypropylate the starch;
   (f) opening the reaction vessel and actively aerating the starch slurry until the propylene oxide concentration in the head space above the starch slurry is below 0.1 parts per million;
   (g) neutralizing the starch with any food grade acid so that the pH of the starch slurry is less than 7; and
   (h) drying the slurry.

2. A process according to claim 1 wherein the reaction vessel is made of stainless steel, capable of containing superatmospheric pressure, and is jacketed so as to control the temperature within the vessel to between 20° C. and 55° C.

3. A process according to claim 1 wherein the pH of the starch slurry is between 10 and 12.5, the hydroxypropylation processing aid is selected from the group consisting of sodium sulfate, magnesium sulfate, disodium orthophosphate, and trisodium orthophosphate and between 0.005 and 0.25 parts of propylene oxide are added to the starch slurry for each part of starch.

4. A process according to claim 1 wherein the alkali solution comprises water and an alkaline salt selected from the group consisting of alkali or alkaline earth metal hydroxides, carbonates, bicarbonates, and phosphates or combinations thereof.

5. A process according to claim 4 wherein the alkaline salt is selected from the group consisting of disodium phosphate, trisodium phosphate, sodium hydroxide, calcium hydroxide, potassium hydroxide, and combinations thereof.

6. A process according to claim 1 wherein the slurry is actively aerated by reducing the atmospheric pressure above the slurry.

7. A process according to claim 1 wherein the slurry is actively aerated by a clean gas which is incorporated into the slurry.

8. A process according to claim 7 wherein the clean gas is air, nitrogen, helium, or combinations thereof.

9. A process according to claim 7 wherein the gas is incorporated into the slurry by being passed through a gas diffusion stone immersed in the slurry.

10. A process according to claim 9 wherein the gas is passed through the gas diffusion stone at the rate of 850 cubic centimeters of STP of the gas per 1 kilogram of the slurry/water.

11. A process according to claim 1 wherein the starch slurry is crosslinked before the slurry is neutralized.

12. A process according to claim 1 wherein the starch slurry is crosslinked before being actively aerated.

13. A process according to claim 1 wherein the alkaline starch slurry is neutralized with a nonchlorine containing food grade acid after the removal of the excess propylene oxide.

14. The starch made by the process of claim 1.

15. An instant pudding mix which comprises the starch made by the process of claim 1.

* * * * *